Sept. 8, 1970 KOICHI YAMAZAKI 3,528,037

CIRCUIT AND METHOD FOR CORRECTION OF TRANSMISSION DISTORTION IN AN AMPLITUDE MODULATION SYSTEM

Filed Nov. 2, 1967

United States Patent Office 3,528,037
Patented Sept. 8, 1970

3,528,037

CIRCUIT AND METHOD FOR CORRECTION OF TRANSMISSION DISTORTION IN AN AMPLITUDE MODULATION SYSTEM

Koichi Yamazaki, Yokohama-shi, Japan, assignor to Fujitsu Limited, Kawasaki, Japan, a corporation of Japan Filed Nov. 2, 1967, Ser. No. 688,643
Claims priority, application Japan, Nov. 4, 1966, 41/72,711
Int. Cl. H03c 1/06, 5/00
U.S. Cl. 332—37 8 Claims

ABSTRACT OF THE DISCLOSURE

A frequency modulator converts an amplitude modulated signal to a frequency modulated signal which is compensated for non-linear distortion in correspondence with non-linear distortion in the amplitude modulated signal. The compensated frequency modulated signal is compensated for phase distortion in correspondence with phase distortion in the amplitude modulated signal and is then converted to an amplitude modulated signal. The amplitude modulated signal is provided as the compensated amplitude modulated signal.

DESCRIPTION OF THE INVENTION

The present invention relates to a circuit and method for compensating transmission distortion in an amplitude modulation system.

In an amplitude modulated or AM transmission system, and especially in the amplifier portion thereof, there are generally two types of distortion. One type of distortion is non-linear distortion, which is based upon the non-linearity of the input-output characteristic. A second type of distortion is phase distortion which is caused by amplitude-to-phase conversion and the like. Various types of amplitude modulation using a high carrier including the transmission of two sidebands, a single sideband and carrier wave carrier wave suppression and carrier wave reduction are considered.

Here the type of transmission is considered, where the band width $\Delta f$ is much less than the signal carrier frequency $f_c$. In this type of transmission, the even harmonic distortion does not exist within the band and only the odd harmonic distortion, such as, for example, the third, fifth, seventh, ninth, and so on, harmonic distortions exist within the band. The odd harmonic distortion causes cross-talk noise in a multiplex telephony system and must be sufficiently suppressed.

The aforementioned distortions have, hitherto, been reduced or suppressed by either providing a transmission system with very little distortion, lowering the level of operation of the transmission system, or feeding back part of the output to the input in a negative manner. In a usual cable carrier system, the distortion may be satisfactorily reduced by the third mentioned negative feedback method. When the carrier frequencies are very high, for example VHF or microwave frequencies, the adoption of negative feedback becomes extreamly difficult. The second mentioned method is utilized because the odd harmonic distortion increases in proportion with the square of the input or output voltage, so that if the level of operation is lowered, the distortion is also lowered. This method, however, requires that the initial level of operation of the transmission system be sufficiently high so that the lowering of the level of operation will bring said level to a satisfactory magnitude and is therefore very uneconomical. It is practically impossible to provide a transmission system having very little distortion, in accordance with the first-mentioned method.

In view of the aforementioned difficulties, most microwave communication systems and the like utilize frequency modulation, since there is no non-linear distortion difficultly in a frequency modulation system. In a communication system involving a space vehicle or satellite or the like, a multiple access system is utilized. In a multiple access system, a single receiver receives signals transmitted from a plurality of transmitters. In such a system, an AM system such as, for example, single sideband transmission is quite suitable. The transmitters of a multiple access system therefore utilize ground-positioned AM amplifiers producing large outputs, so that the problem of distortion arises and it is necessary to reduce or suppress such distortion.

The principal object of the present invention is to provide a new and improved circuit and method for compensating transmission distortion in an amplitude modulation system. The circuit and method of the present invention overcome the disadvantages of the systems and methods of the prior art. The circuit and method of the present invention reduce and suppress transmission distortion in an amplitude modulation system with efficiency, effectiveness and reliability. The transmission distortion compensation circuit and method of the present invention are simple and inexpensive in operation.

In accordance with the present invention, a compensation circuit for transmission distortion in an AM system comprises a frequency modulator for converting an AM signal to a frequency modulated or FM signal. A non-linear distortion compensating circuit has an input connected to the output of the frequency modulator and compensates for non-linear distortion in the FM signal corresponding to non-linear distortion in the AM signal. A converter having an input connected to the output of the non-linear distortion compensating circuit converts the compensated FM signal to an AM signal. An output connected to the output of the converter provides the compensated AM signal. A phase distortion compensating circuit is included which has an input connected to the output of the non-linear distortion compensating circuit and an output connected to the input of the converter and compensates for phase distortion in the FM signal corresponding to phase distortion in the AM signal.

The non-linear distortion compensating circuit non-linearly distorts the FM signal inversely to the non-linear distortion of the AM signal. The phase distortion compensating circuit phase distorts the FM signal inversely to the phase distortion of the AM signal. The frequency modulator includes a varying device for varying the modulation characteristic of the frequency modulator and the non-linear distortion compensating circuit comprises a control for controlling the varying device to vary the modulation characteristic of the frequency modulator. The phase distortion compensating circuit comprises an equivalent transmission line and a phase shifting circuit for varying the length of the equivalent transmission line.

In accordance with the present invention, a method of compensating for transmission distortion in an AM system comprises converting an AM signal to an FM signal. Non-linear distortion in the FM signal is compensated for in correspondence with non-linear distortion in the AM signal. Phase distortion in the FM signal is compensated for in correspondence with phase distortion in the AM signal. The compensated FM signal is converted to an AM signal.

In order that the present invention may be readily carried into effect, will now be described with reference to the accompanying drawing, wherein.

Figure 1:
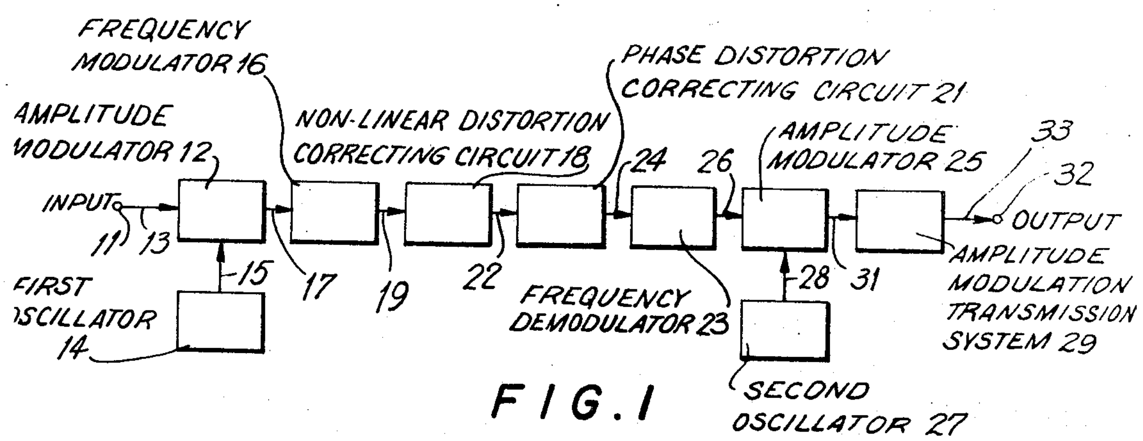
FIG. 1 is a block diagram of an embodiment of the compensation circuit of the present invention.

In FIG. 1, an input signal $fi$ is supplied to an input terminal 11. The input signal may comprise a multiple frequency composite signal having a bandwidth of $\Delta f$. The input signal is amplitude modulated by amplitude modulator 12 to the input of which said input signal is supplied via a lead 13. The carrier for the AM signal is provided by a first oscillator 14 which is connected to the amplitude modulator 12 via a lead 15. The frequency for the carrier provided by the first oscillator 14 is $f_{c1}$. Although, for the purposes of illustration, a single sideband modulation of transmission is assumed, any suitable AM system may utilize the circuit and method of the present invention. The amplitude modulator 12 may comprise any suitable known amplitude modulator. A suitable amplitude modulator is described, for example, in "Basic Radio" by J. B. Hoag, 1942, D. Van Nostrand Company, Inc., New York, N.Y., pages 213 to 217.

Figure 2:
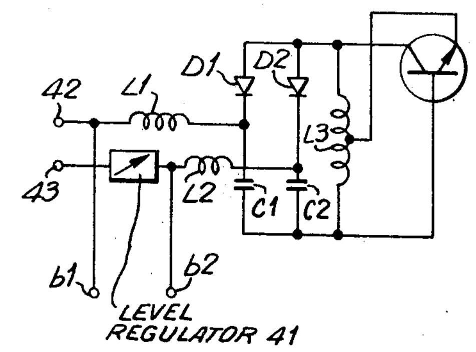
FIG. 2 is a circuit diagram of an embodiment of a frequency modulator which may be utilized as the frequency modulator of the embodiment of FIG. 1.

The output of the amplitude modulator 12 is connected to the input of a frequency modulator 16 via a lead 17, and the AM signal produced by said amplitude modulator is converted into an FM signal by said frequency modulator. A frequency modulator circuit which may be utilized as the frequency modulator 16 of FIG. 1 is shown in FIG. 2 and the operation of such circuit is illustrated in the graphical presentation of FIG. 3. The non-linear and phase distortion present in the AM signal provided by the amplitude modulator 12 are also present in the FM signal provided by the frequency modulator 16.

The output of the frequency modulator 16 is connected to the input of a non-linear distortion compensating circuit 18 via a lead 19. The output of the non-linear distortion compensating circuit 18 is connected to the input of a phase distortion compensating circuit 21 via a lead 22. The non-linear distortion compensating circuit 18 is included in the frequency modulator 16, as shown in FIG. 2. The phase distortion compensating circuit 21 may comprise any suitable phase shifting circuit such as, for example, that shown in FIG. 4.

The non-linear distortion compensating circuit 18 compensates for non-linear distortion in the FM signal provided by the frequency modulator 16. The non-linear distortion in the FM signal corresponds to the non-linear distortion in the AM signal supplied to the frequency modulator 16. The compensation is achieved by non-linear distortion of the FM signal provided by the frequency modulator 16 inversely to the non-linear distortion of the AM signal.

The phase distortion compensating circuit 21 compensates for phase distortion in the FM signal provided by the frequency modulator 16. The phase distortion in the FM signal corresponds to the phase distortion in the AM signal supplied to the frequency modulator 16. The compensation for phase distortion is accomplished by phase distortion of the FM signal inversely to the phase distortion of the AM signal. The non-linear distortion compensation is described in further detail with relation to the discussion of FIGS. 2 and 3 and the phase distortion compensation is disclosed in greater detail with relation to the discussion of FIG. 4.

The output of the phase distortion compensating circuit 21 is connected to the input of a frequency demodulator 23 via a lead 24. The frequency demodulator 23 may comprise any suitable known frequency demodulator. A suitable frequency demodulator may comprise, for example, that disclosed in "Directory of Electronic Circuits," by M. Mandl, 1966, Prentice-Hall Inc., Englewood Cliffs, N.J., pages 53 to 56. The frequency demodulator 23 detects the compensated FM signal provided by the phase distortion compensating circuit 21.

The operating frequencies of the frequency modulator 16 and the frequency demodulator 23 are sufficiently high relative to the carrier frequency $f_{c1}$. Each of the frequency modulator 16 and the frequency demodulator 23 is an ideal non-distortion circuit. In a preferred embodiment of the present invention, the frequency modulator 16 and the non-linear distortion compensating circuit 18 are included in the same circuit and the frequency demodulator 23 and the phase distortion compensating circuit 21 are included in the same circuit.

If the non-linear distortion provided by the non-linear distortion compensating circuit 18 and the phase distortion created by the phase distortion compensating circuit 21 are zero, the AM signal provided by the amplitude modulator 12 and the signal provided by the frequency demodulator 23 are the same. The signal provided by the frequency demodulator 23 is an FM signal. The signal provided by the frequency demodulator 23 is amplitude modulated in an amplitude modulator 25 having an input connected to the output of said frequency demodulator via a lead 26. The carrier for the AM signal provided by the amplitude modulator 25 is provided by a second oscillator 27 which is connected to said amplitude modulator via a lead 28. The frequency of the carrier of the AM signal provided by the amplitude modulator 25 is $f_{c2}$.

The AM signal provided by the amplitude modulator 25 is supplied from the output of said amplitude modulator to the input of an amplitude modulation transmission system 29 via a lead 31. The AM signal to be transmitted is provided at an output terminal 32 which is connected to the output of the amplitude modulation transmission system 29.

The non-linear distortion is compensated for in the following manner. It is assumed that the angular operating frequency of the frequency modulator 16 and the frequency demodulator 23 is $\omega c$, the frequency deviation from the reference level is $\omega m$ and the input voltage to the amplitude modulation transmission system 29 is $v$. Since it is also assumed that the fractional bandwidth is sufficiently small, only the odd harmonics need be compensated for, as hereinbefore described. The characteristic of the non-linear distortion compensating circuit 18 is then $$\omega m' = \omega m + \alpha_3 \omega m^3 + \alpha_5 \omega m^5 + \dots \quad (1)$$

The non-linear distortion of the amplitude modulation transmission system 29 is $$v' = A(v + \beta_3 v^3 + \beta_5 v^5 + \dots) \quad (2)$$

wherein $\omega m'$ is the frequency deviation which includes the compensating non-linear distortion provided by the non-linear distortion compensating circuit 18, A is the amplification of the amplitude modulation transmission system 29, and $v'$ is the output voltage of said amplitude modulation transmission system.

As is evident from Equations 1 and 2, if $\alpha_3$ equals minus $\beta_3$ and $\alpha_5$ equals minus $\beta_5$, and so on, the non-linear distortion of the AM and FM signals compensate each other and the output voltage of the amplitude modulation transmission system 29 is free from non-linear distortion.

The phase distortion is compensated as follows. The phase distortion characteristic of the odd harmonics of the FM signal is $$\phi(\omega m) = \gamma_3 m^3 + \gamma_5 \omega m^5 + \dots \quad (3)$$

This may be expressed in terms of transmission time distortion $\tau$.

$$\tau(\omega m)=\frac{d\phi(\omega m)}{d\omega m}(3\gamma_3\omega m^3+5\gamma_5\omega m^5+\ldots) \quad (4)$$

The frequency deviation $wm''$ of the compensated phase distortion provided by the phase distortion compensating circuit 21 is then $$\omega m''=\omega m+\frac{d}{dt}(\gamma_3\omega m^3+\gamma_5\omega m^5+\ldots) \quad (5)$$

Since the signal modulating the carrier to provide the FM signal has a frequency of $fc\pm fi$, which is essentially similar to $f_{c1}$ and since $f_{c1}$, which is the frequency of the carrier provided by the first oscillator 14, is considerably greater than the frequency $fi$ of the input signal, the frequency deviation $\omega m''$ may be expressed as $$\omega m''=\omega m+j2\pi f_{c1}(\gamma_3\omega m^3+\gamma 5\omega m^5+\ldots) \quad (6)$$

wherein the modulation signal $\omega m$ is a multiple frequency composite signal, the signals $\omega m^3$ and $\omega m^5$ are the composite signals of the components within the bands of the third and fifth harmonics, respectively, of the modulation signal $\omega m$, and $j$ is a phase difference of 90°.

The phase distortion in the amplitude modulation transmission system 29, caused by the amplitude modulation to phase modulation conversion is provided as follows. The amplitude modulation to phase modulation conversion is defined as being the variation of the phase of the amplitude modulation transmission system 29 in correspondence with the amplitude of the input signal supplied thereto via the lead 31. The phase of the amplitude modulation transmission system 29 is varied in proportion with the square of the input voltage $v$ supplied via the lead 31. The phase difference $\theta$ between the input and the output of the amplitude modulation transmission system 29 is $$\theta=\theta_0+k_3v^2+k_5v^4+\ldots$$
$$\theta=\theta_0+k_3p+k_5p^2+\ldots \quad (7)$$

wherein $p$ is electrical power equal to $v^2$. The amplitude to phase modulation conversion is also indicated by K in degrees per $db$ by indicating the phase deviation in degrees with relation to the level change in a unit $db$ at the time of the designated input and output electrical power. The amplitude to phase modulation conversion K is related to the factors $k_3$, $k_5$ and so on, as follows:

$$\frac{d\theta}{dp/p}=k_3p+2k_5p^2+\ldots$$

$$K=\left(\frac{180}{\pi}\right)\left(\frac{1}{4.34}\right)\left(\frac{d\theta}{dp/p}\right)=13.2(k_3p+2k_5p^2+\ldots) \quad (8)$$

When the angular frequency of the input signal of the amplitude modulation transmission system 29 is $\omega_{c2}+\Phi(t)$, the input signal $v$ of said amplitude modulation transmission system is expressed as $$v=kv(t)\ \mathrm{Exp}\ [j(\omega_{c2}t+\Phi(t))] \quad (9)$$

If there is no non-linear distortion, the output $v''$ of the amplitude modulation transmission system 29 is $$v''(t)=AR[v(t)\ \mathrm{Exp}\ (j(\omega_{c2}t+\Phi(t)+k_3v^2+k_5v+\ldots))] \quad (10)$$

If it is assumed that $k_3v^2+k_5v^4$ is considerably less than 1, then $$\cos[\omega_{c2}t+\Phi(t)]+k_3v^2+k_5v^4+\ldots$$
$$=\cos[\omega_{c2}t+\Phi(t)]\cos(k_3v^2+k_5v^4)$$
$$-\sin[\omega_{c2}t+\Phi(t)]\sin(k_3v^2+k_5v^4)$$

Since cos $(k_3v^2+k_5v^4)$ is approximately equal to 1, the foregoing equation becomes $$\cos[\omega_{c2}t+\Phi(t)]-(k_3v^2+k_5v^4+\ldots)$$
$$\sin[\omega_{c2}t+\Phi(t)$$

and $v''(t)$ may be expressed as $$v''(t)=AR[v(t)+j(k_3v^2(t)+k_5v^4(t)+\ldots)v(t)] \quad (11)$$

Therefore, if $$-k_3=2\pi f_{c1}\gamma_3$$
and
$$-k_5=2\pi f_{c1}\gamma_5 \quad (12)$$

in Equations 6 and 11, the phase distortion of the AM system and the FM system may be eliminated. In the embodiment of FIG. 1, the non-linear distortion compensating circuit 18 may be, and is preferably, included in the frequency modulator 16 (FIG. 2). A microwave modulator such as, for example, a klystron, may be utilized as the frequency modulator 16. It is, however, more convenient to utilize a frequency modulator which includes variable capacity diodes, as shown in FIG. 2.

Figure 3:
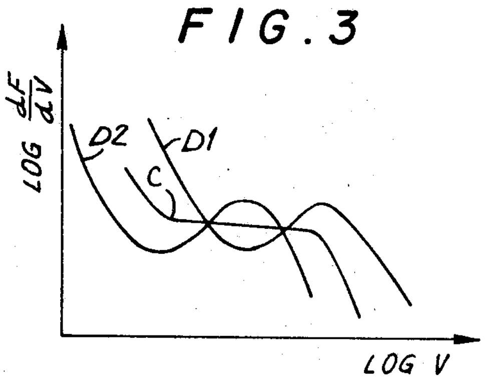
FIG. 3 is a graphical presentation illustrating the operation of the frequency modulator of FIG. 2 in compensating for non-linear distortion.

The frequency modulator 16, as shown in FIG. 2, operates in an intermediate frequency band and has a modulation characteristic which is controlled in accordance with the desired compensaion of the non-linear distortion, as hereinbefore indicated. In FIG. 2, the two variable capacity diodes are indicated as D1 and D2. In FIG. 3, the differential characteristic, which indicates the voltage-frequency linearity of the frequency modulator, is graphically illustrated. In FIG. 3, the abscissa represents log V, which is the log of the voltage of the frequency modulator, and the ordinate represents $$\log\frac{dF}{dV}$$

which is the log of the rate of change of the frequency of the frequency modulator with regard to voltage.

The variable capacity diodes D1 and D2 of FIG. 2 are biased in such a manner that the differential characteristic of one of said diodes is concave relative to the abscissa and the differential characteristic of the other of said diodes is convex relative to the abscissa. This type of arrangement is disclosed in copending patent application Ser. No. 620,994, filed Mar. 6, 1967, and assigned to the assignee of the present invention. The differential characteristic of the variable capacity diode D1 is labelled D1 in FIG. 3 and the differential characteristic of the variable capacity diode D2 is labelled D2 in FIG. 3. It is thus possible to control or regulate the levels of the signals by the biasing voltage applied to biasing voltage terminals *b*1 and *b*2 of FIG. 2. The variable capacity diode D1 is biased via the biasing voltage terminal *b*1 and the variable capacity diode D2 is biased via the biasing voltage terminal *b*2.

The modulation signal input level may be controlled or regulated by a level regulator for control unit 41. The modulation signal is supplied to the frequency modulator 16 via input terminals 42 and 43. The frequency modulator circuit of FIG. 2 thus controls the composite differential or modulation characteristic, indicated by the curve C of FIG. 3, and satisfies Equations 1 and 2.

It is possible to detect the non-linear distortion component from the output of the amplitude modulation transmission system 29, to control the bias voltages *b*1 and *b*2 of the variable capacity diodes D1 and D2, with the detected non-linear distortion component, and automatically control and compensate for the non-linear distortion thereby.

Figure 4:
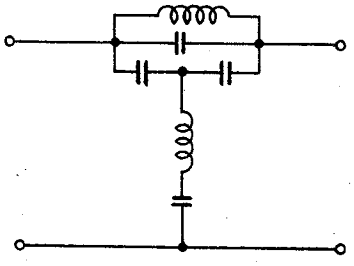
FIG. 4 is a circuit diagram of an embodiment of a phase distortion compensating circuit which may be utilized in the embodiment of FIG. 1.

The phase distortion compensating circuit 21 may comprise a suitable known bridge circuit, as shown in FIG. 4, wherein the phase characteristic is varied by the frequency. In the bridge circuit of FIG. 4, each inductance and capacitance may have a value determined to satisfy Equation 12, so that the phase distortion may be compensated with facility and rapidity.

As in the case of the non-linear distortion, it is possible to detect the phase distortion component of the output of the amplitude modulation transmission system 29, to vary the value of each of the inductances and capacitances of FIG. 4, and to utilize the detected phase distortion output component to automatically control and compensate for the phase distortion.

The phase distortion may also be compensated by varying the length of an equivalent transmission line and shifting the phase thereof. This may be accomplished by varying the length of a coaxial cable or a wave guide by utilizing, for example, a short plunger and a phase shifter for inserting and removing the dielectric plate, or by utilizing a cathode ray phase shifter.

The compensation circuit and method of the present invention thus compensate or correct non-linear distortion and phase distortion in an AM system by utilization of linear components. Thus, when there is distortion in an AM system, the total distortion may be readily reduced to a predetermined low level by such compensation and the ensuing system is therefore readily, facilely and inexpensively freed from distortion.

In accordance with the present invention, distortion in the output of the AM transmission system is reduced, suppressed or eliminated with facility and rapidity, by compensating the non-linear distortion and phase distortion in an FM system.

While the invention has been described by means of specific examples and in a specific embodiment, I do not wish to be limited thereto, for obvious modifications will occur to those skilled in the art without departing from the spirit and scope of the invention.

What is claimed is:

1. A compensation circuit for transmission distortion in an amplitude modulation system, said compensation circuit comprising input means having an output for providing an amplitude modulated signal;

frequency modulating means having an input connected to the output of said input means and an output for converting said amplitude modulated signal to a frequency modulated signal;

non-linear distortion compensating means having an input connected to the output of said frequency modulating means and an output for compensating for non-linear distortion in said frequency modulated signal corresponding to non-linear distortion in said amplitude modulated signal;

converting means having an input connected to the output of said non-linear distortion compensating means and an output for converting the compensated frequency modulated signal to an amplitude modulated signal, said converting means comprising frequency demodulating means and amplitude modulating means connected to said frequency demodulating means, said amplitude modulating means having an oscillator; and output means connected to the output of said converting means for providing the compensated amplitude modulated signal.

2. A compensation circuit as claimed in claim 1, further comprising phase distortion compensating means having an input connected to the output of said non-linear distortion correcting means and an output connected to the input of said converting means for compensating for phase distortion in said frequency modulated signal corresponding to phase distortion in said amplitude modulated signal.

3. A compensation circuit as claimed in claim 2, wherein said non-linear distortion compensating means comprises means for non-linearly distorting said frequency modulated signal inversely to the non-linear distortion of said amplitude modulated signal.

4. A compensation circuit as claimed in claim 2, wherein said phase distortion compensating means comprises means for phase distorting said frequency modulated signal inversely to the phase distortion of said amplitude modulated signal.

5. A compensation circuit as claimed in claim 2, wherein said frequency modulating means includes varying means for varying the modulation characteristic of said frequency modulating means and wherein said non-linear distortion compensating means comprises control means for controlling said varying means to vary the modulation characteristic of said frequency modulating means.

6. A compensation circuit as claimed in claim 2, wherein said phase distortion compensating means comprises an equivalent transmission line and phase shifting means for varying the length of said equivalent transmission line.

7. A method of compensating for transmission distortion in an amplitude modulation system, comprising providing an amplitude modulated signal;

converting the amplitude modulated signal to a frequency modulated signal;

compensating for non-linear distortion in the frequency modulated signal corresponding to non-linear distortion in the amplitude modulated signal;

converting the compensated frequency modulated signal to an amplitude modulated signal by frequency demodulating and then amplitude modulating the frequency modulated signal; and providing the compensated amplitude modulated signal.

8. A method as claimed in claim 7, further comprising compensating for phase distortion in the frequency modulated signal corresponding to phase distortion in the amplitude modulated signal.

References Cited

UNITED STATES PATENTS 2,347,398 4/1944 Crosby ____________ 332—41 X

ROY LAKE, Primary Examiner

L. J. DAHL, Assistant Examiner

U.S. Cl. X.R.

332—1